W. A. GEIGER.
SHOCK ABSORBING MECHANISM.
APPLICATION FILED SEPT. 30, 1918.
1,303,288.
Patented May 13, 1919.
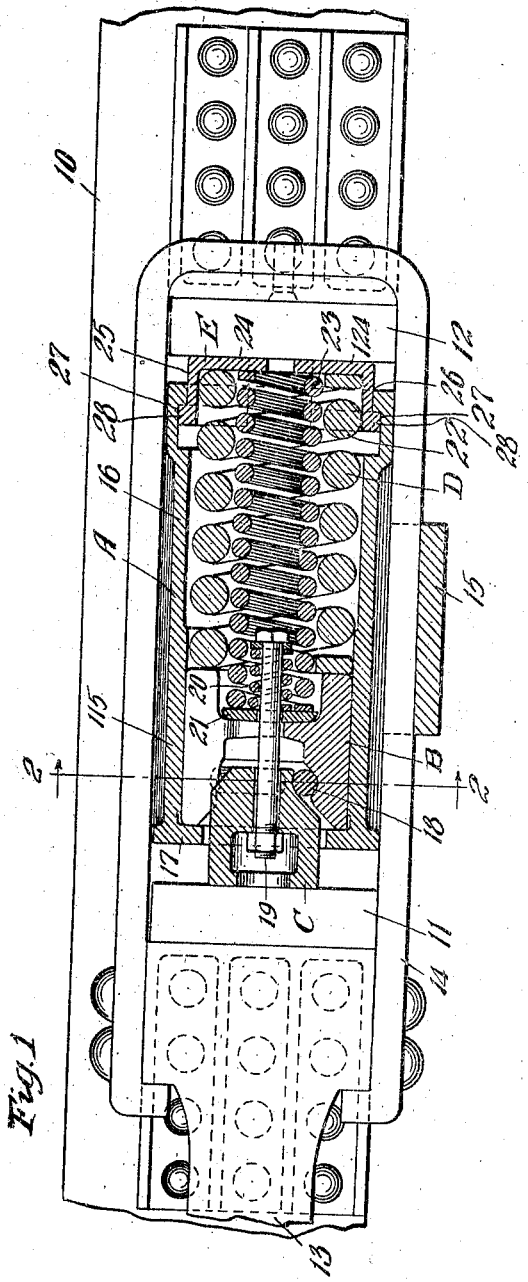
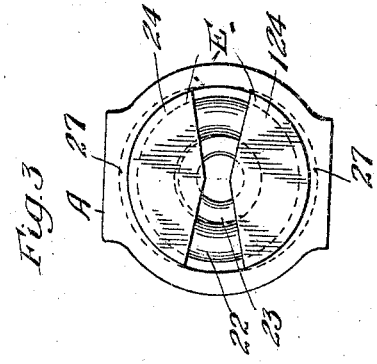
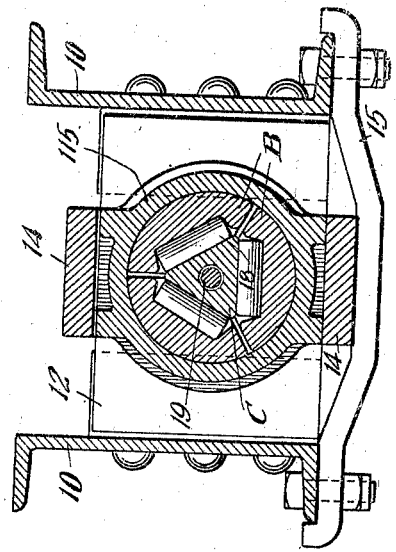
INVENTOR.
William A. Geiger
BY George J. Haight
ATTORNEY

UNITED STATES PATENT OFFICE.

WILLIAM A. GEIGER, OF CHICAGO, ILLINOIS, ASSIGNOR TO WILLIAM H. MINER, OF CHAZY, NEW YORK.

SHOCK-ABSORBING MECHANISM.

1,303,288. Specification of Letters Patent. Patented May 13, 1919.

Application filed September 30, 1918. Serial No. 256,165.

*To all whom it may concern:*

Be it known that I, WILLIAM A. GEIGER, a citizen of the United States, residing at Chicago, in the county of Cook and State of Illinois, have invented a certain new and useful Improvement in Shock-Absorbing Mechanism, of which the following is a full, clear, concise, and exact description, reference being had to the accompanying drawings, forming a part of this specification.

This invention relates to improvements in shock absorbing mechanism.

The object of the invention is to provide an improved friction shock absorbing mechanism more particularly adapted for railway draft riggings and wherein a preliminary spring action is obtained by employing the main spring of the mechanism.

More specifically, the object of the invention is to provide a novel form of connection between a preliminary spring follower and friction shell or casing of a shock absorbing mechanism.

In the drawing forming a part of this specification, Figure 1 is a vertical, longitudinal, sectional view of a portion of a railway draft rigging showing my improvements in connection therewith. Fig. 2 is a vertical, transverse section taken on the line 2—2 of Fig. 1. And Fig. 3 is a rear end elevational view of the shock absorbing mechanism proper.

In said drawing, 10—10 denote center or draft sills of a railway car provided on the inner faces thereof with the usual stop lugs with which coöperate front followers 11 and 12. A draw bar 13 is shown, the same bning operatively connected to the shock absorbing mechanism by a yoke 14 and all the parts are suitably supported by a saddle plate 15.

The shock absorbing mechanism proper, as shown, comprises a substantially cylindrical casting A, a series of friction shoes B, a wedge C, a main spring D, and a rear preliminary spring follower E.

The casting A is formed with a friction shell proper 115 at its forward end and a preferably integral spring casing 16 at its rear end. The casting A is open at both ends and at its forward end is formed with an inturned annular flange 17. The friction shoes B are preferably three in number and arranged in a well known manner in a circular series within the shell 115. In the construction shown, the shoes B are limited in their outward movement by engagement with said flange 17. The wedge C is extended within the shoes B and anti-friction rollers 18—18 are preferably interposed between the shoes and wedge. A retaining bolt 19 is extended through the wedge to a point rearwardly thereof and on said bolt is placed a spring 20 interposed between the head on the rear end of the bolt and a washer 21 which bears against inwardly extending flanges formed on the shoes B.

The main spring D of the mechanism preferably comprises an outer heavy coil 22 and an inner lighter nested coil 23. These coils bear at their forward ends against the shoes as clearly shown in Fig. 1, and at their rear ends against the follower E. Said follower E is shown as formed in two sections 24 and 124. Each section of the follower E is substantially in the form of a sector with a comparatively large angle but somewhat less than 180°. The sections of the follower are provided with forwardly extended flanges 25 curved to fit the circular opening 26 formed in the rear end of the casting A. The casting A, at its rear end, is provided with two undercut grooves 27—27, the same being of relatively thin crescent formation as the casting A is viewed in end elevation. Each part of the follower E is formed with a correspondingly shaped flange 28 fitting in a recess 27, the thickness of the flanges 28 being less than the width of the recesses 27 so as to permit a predetermined amount of relative longitudinal movement between the follower E and the casting A, as will be apparent from an inspection of Fig. 1.

In assembling the device, the wedge, rollers, shoes and retaining bolt are first applied, preferably through the inner end of the casting. Thereafter the main spring is inserted and by means of a bulldozer the spring is compressed sufficiently to permit the insertion of the two parts of the follower E, one part at a time. In this connection, it will be observed, from inspection of Fig. 3, that sufficient clearance is left between the two parts of the follower E to permit engagement of the spring by an element of the bulldozer while the spring is under compression.

The arrangement presents a simple manner of attaching a preliminary spring follower to a friction shell or spring casing by integral coöperating means and the main spring of the mechanism is utilized to maintain the proper relation of the follower and shell or casing.

I claim:

1. In a friction shock absorbing mechanism, the combination with a friction shell and spring casing, friction elements coöperable with the shell, and a spring within the casing, of a follower coöperable with said casing, said follower comprising a plurality of independent parts, said casing and parts of the follower having coöperating shoulders permitting a predetermined amount of relative movement between the casing and follower and limiting the movement of said follower outwardly with respect to the casing, said spring engaging said follower parts and adapted to maintain the latter in operative position.

2. In a shock absorbing mechanism, the combination with a casting having an opening in one end thereof, said casting being internally recessed adjacent said opening and providing internal shoulders, of a follower comprising a plurality of parts, the parts of said follower being insertible within the opening of said casting and having shoulders arranged to be seated within the recessed portions of the casting, the parts of said follower being movable relatively to the casting, and a spring disposed within said casting and having one end thereof seated within the multiple part follower, said spring being adapted to hold the parts of the follower in expanded relation.

In witness that I claim the foregoing I have hereunto subscribed my name this 18th day of Sept., 1918.

WILLIAM A. GEIGER.